US010301703B2

(12) United States Patent
Aratani et al.

(10) Patent No.: US 10,301,703 B2
(45) Date of Patent: May 28, 2019

(54) HIGH-STRENGTH WELDED STEEL PIPE FOR AIRBAG INFLATOR AND METHOD FOR MANUFACTURING THE SAME

(71) Applicant: JFE STEEL CORPORATION, Tokyo (JP)

(72) Inventors: Masatoshi Aratani, Handa (JP);
Yoshikazu Kawabata, Kurashiki (JP);
Kenichi Iwazaki, Kawasaki (JP); Ryoji Matsui, Handa (JP)

(73) Assignee: JFE STEEL CORPORATION, Tokyo (JP)

( * ) Notice: Subject to any disclaimer, the term of this patent is extended or adjusted under 35 U.S.C. 154(b) by 188 days.

(21) Appl. No.: 15/520,159

(22) PCT Filed: Oct. 19, 2015

(86) PCT No.: PCT/JP2015/005249
§ 371 (c)(1),
(2) Date: Apr. 19, 2017

(87) PCT Pub. No.: WO2016/063513
PCT Pub. Date: Apr. 28, 2016

(65) Prior Publication Data
US 2018/0023163 A1 Jan. 25, 2018

(30) Foreign Application Priority Data

Oct. 23, 2014 (JP) .................................. 2014-216171

(51) Int. Cl.
*C21D 9/08* (2006.01)
*C21D 9/50* (2006.01)
(Continued)

(52) U.S. Cl.
CPC ................ *C21D 9/50* (2013.01); *B21B 23/00* (2013.01); *B21C 37/08* (2013.01); *B21C 37/30* (2013.01);
(Continued)

(58) Field of Classification Search
CPC ...... B23K 26/21; B23K 26/211; B23K 26/22; B23K 26/24; B23K 26/242; B23K 26/244;
(Continued)

(56) References Cited

U.S. PATENT DOCUMENTS 7,048,811 B2 * 5/2006 Ohgami ............... C22C 38/002
148/330
2006/0169368 A1 8/2006 Lopez et al.
2009/0277544 A1 11/2009 Toyoda et al.

FOREIGN PATENT DOCUMENTS

CN 101289727 A 10/2008
CN 102330034 A 1/2012
(Continued)

OTHER PUBLICATIONS

Chinese Office Action for Chinese Application No. 201580056771. 5, dated Apr. 2, 2018, including Concise Statement of Search Report, 9 pages.
(Continued)

*Primary Examiner* — Scott R Kastler
*Assistant Examiner* — Vanessa T. Luk
(74) *Attorney, Agent, or Firm* — RatnerPrestia

(57) ABSTRACT

Disclosed is a high-strength welded steel pipe for airbag inflators that has high toughness and workability. A base material portion of the steel pipe has a composition containing, in mass %, C: 0.02 to 0.08%, Si: 0.001 to 1.0%, Mn: 0.1 to 2.0%, P: 0.1% or less, Al: 0.01 to 0.1%, N: 0.01% or less, Ti: 0.01 to 0.20%, and V: 0.01 to 0.50%, with the
(Continued)

balance being Fe and incidental impurities. The base material portion has a structure that includes a ferrite phase having an average grain size of 10 μm or less at an area fraction of 90% or more and a Ti, V-based carbide having an average grain size of 10 nm or less and dispersed in the ferrite phase. The welded steel pipe has a high tensile strength TS of 780 MPa or more and a strength-elongation balance TS×El of 15,000 MPa % or more. The difference ΔHV in Vickers hardness between the base material portion and the welded portion is 60 points or less. In a softened portion having Vickers hardness different from the Vickers hardness of the base material portion by at least 30 points, a softened width Ws in a circumferential direction is 0.05 mm or less.

6 Claims, 2 Drawing Sheets

(51) Int. Cl.
| | |
|---|---|
| C22C 38/38 | (2006.01) |
| C22C 38/58 | (2006.01) |
| C22C 38/00 | (2006.01) |
| B23K 26/262 | (2014.01) |
| B23K 26/282 | (2014.01) |
| B21B 23/00 | (2006.01) |
| B21C 37/08 | (2006.01) |
| C22C 38/02 | (2006.01) |
| C22C 38/04 | (2006.01) |
| C22C 38/06 | (2006.01) |
| C22C 38/20 | (2006.01) |
| C22C 38/24 | (2006.01) |
| C22C 38/26 | (2006.01) |
| C22C 38/28 | (2006.01) |
| C22C 38/42 | (2006.01) |
| C22C 38/46 | (2006.01) |
| C22C 38/50 | (2006.01) |
| F16L 9/17 | (2006.01) |
| B21C 37/30 | (2006.01) |
| B23K 26/32 | (2014.01) |
| B23K 31/02 | (2006.01) |
| C21D 8/10 | (2006.01) |
| B23K 26/60 | (2014.01) |
| B60R 21/261 | (2011.01) |
| B60R 21/26 | (2011.01) |
| B23K 101/06 | (2006.01) |
| B23K 101/16 | (2006.01) |
| B23K 103/04 | (2006.01) |

(52) U.S. Cl.
CPC .......... *B23K 26/262* (2015.10); *B23K 26/282* (2015.10); *B23K 26/32* (2013.01); *B23K 26/60* (2015.10); *B23K 31/027* (2013.01); *C21D 8/105* (2013.01); *C21D 9/08* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/24* (2013.01); *C22C 38/26* (2013.01); *C22C 38/28* (2013.01); *C22C 38/38* (2013.01); *C22C 38/42* (2013.01); *C22C 38/46* (2013.01); *C22C 38/50* (2013.01); *C22C 38/58* (2013.01); *F16L 9/17* (2013.01); *B23K 2101/06* (2018.08); *B23K 2101/16* (2018.08); *B23K 2103/04* (2018.08); *B60R 21/26* (2013.01); *B60R 21/261* (2013.01); *B60R 2021/2612* (2013.01)

(58) Field of Classification Search
CPC ...... B23K 26/26; B23K 26/262; B23K 26/28; B23K 26/282; B23K 26/30; B23K 26/302; B23K 26/32; B23K 26/60; B23K 31/027; B23K 2101/06; B23K 2101/08; B23K 2101/10; B23K 2101/12; B23K 2103/02; B23K 2103/04; B23K 2103/05; B23K 2103/06; C21D 8/10; C21D 8/105; C21D 9/08; C21D 9/085; C21D 9/10; C21D 9/12; C21D 9/14; C21D 9/50; C21D 9/505; C21D 2211/005; F16L 5/022; F16L 23/026
See application file for complete search history.

(56) References Cited

FOREIGN PATENT DOCUMENTS

| JP | 10140249 A | 5/1998 |
|---|---|---|
| JP | 10140250 A | 5/1998 |
| JP | 10140283 A | 5/1998 |
| JP | H11106862 A | 4/1999 |
| JP | 2002322542 A | 11/2002 |
| JP | 2003138344 A | 5/2003 |
| JP | 2008013808 A | 1/2008 |
| JP | 2009057620 A | 3/2009 |
| JP | 2009532584 A | 9/2009 |
| JP | 2010275594 A | 12/2010 |

OTHER PUBLICATIONS

International Search Report and Written Opinion for International Application No. PCT/JP2015/005249, dated Jan. 12, 2016, 6 pages.
Chinese Office Action for Chinese Application No. 201580056771. 5, dated Nov. 23, 2018 with Concise Statement of Relevance of Office Action, 5 pages.

* cited by examiner

[1]

[2]

[3]

HIGH-STRENGTH WELDED STEEL PIPE FOR AIRBAG INFLATOR AND METHOD FOR MANUFACTURING THE SAME

CROSS REFERENCE TO RELATED APPLICATIONS

This is the U.S. National Phase application of PCT/JP2015/005249, filed Oct. 19, 2015, and claims priority to Japanese Patent Application No. 2014-216171, filed Oct. 23, 2014, the disclosures of each of these applications being incorporated herein by reference in their entireties for all purposes.

FIELD OF THE INVENTION

The present invention relates to a high-strength, high-toughness welded steel pipe and particularly to a high-strength welded steel pipe excellent in toughness and workability and suitable for airbag inflators.

BACKGROUND OF THE INVENTION

In recent years, there is a strong desire to improve automotive crash safety, and, in particular, installation of safety devices for protecting occupants in a collision is actively promoted. Specifically, airbags are becoming more common. At the time of a collision, an airbag inflates between an occupant and the steering wheel or the instrument panel, and the kinetic energy of the occupant is thereby absorbed to reduce the damage to the occupant. In particular, a driver-side airbag housed in the steering wheel and a passenger-side airbag housed in the instrument panel are becoming standard equipment. Recently, in addition to these airbags, side airbags installed in seats and curtain airbags configured to cover side windows are mounted on many automobiles to protect occupants at the time of a side collision. An inflator for an airbag (hereinafter referred to as an airbag inflator) includes a bottle serving as a container.

Methods used for many conventional airbags include a method in which an explosive contained in an inflator is used to generate gas and a method in which the thermal expansion of reaction gas contained in an inflator is used. In one recently used method, an inflator is filled with an inert gas such as argon at high pressure instead of using an explosive, in consideration of recycling and environment.

Generally, a bottle for an airbag is manufactured by processing a steel pipe. The steel pipe is subjected to cold drawing to obtain prescribed dimensions, and the resulting steel pipe is cut to a prescribed length. Then both ends of the pipe are subjected to, for example, press working, and seal plates are welded to thereby obtain a bottle. Therefore, there is a need for a steel pipe for airbag inflators that has sufficient strength and toughness and is excellent in workability and weldability.

In view of the above need, for example, Patent Literature 1 describes a method for manufacturing a high-strength, high-toughness steel pipe for airbags. The method includes: preparing a pipe using steel containing C: 0.01 to 0.20%, Si: 0.50% or less, Mn: 0.30 to 2.00%, P: 0.020% or less, S: 0.020% or less, and Al: 0.10% or less and further containing at least one of Mo: 0.50% or less, V: 0.10% or less, Ni: 0.50% or less, Cr: 1.00% or less, Cu: 0.50% or less, Ti: 0.10% or less, Nb: 0.10% or less, and B: 0.005% or less, with the balance being Fe and incidental impurities; then subjecting the pipe to cold working; and optionally subjecting the cold-worked pipe to annealing, normalizing, or quenching and tempering. The steel pipe described in Patent Literature 1 may be an electric resistance welded steel pipe or may be a seamless steel pipe. The steel pipe obtained has high dimensional accuracy, is excellent in workability and weldability, has high strength and high toughness, and can be used for accumulators of airbags (bottles of airbags).

Patent Literature 2 describes a method for manufacturing a high-strength, high-toughness steel pipe for airbags. The method includes: preparing a pipe using steel containing C: 0.05 to less than 0.15%, Si: 0.50% or less, Mn: 0.30 to 2.00%, P: 0.020% or less, S: 0.020% or less, and Al: 0.1% or less and further containing at least one of Mo: 0.50% or less, V: 0.10% or less, Ni: 0.50% or less, Cr: 1.00% or less, Cu: 0.50% or less, Ti: 0.10% or less, Nb: 0.10% or less, and B: 0.005% or less, with the balance being Fe and incidental impurities; normalizing the pipe at 850 to 1,000° C.; cold-working the resulting pipe to prescribed dimensions; and optionally subjecting the cold-worked pipe to stress relief annealing, normalizing, or quenching and tempering. The steel pipe described in Patent Literature 2 may be an electric resistance welded steel pipe or may be a seamless steel pipe. The steel pipe obtained has high dimensional accuracy, is excellent in workability and weldability, has high strength and high toughness, and can be used for accumulators of airbags etc.

Patent Literature 3 describes a method for manufacturing a high-strength, high-toughness steel pipe for airbags. The method includes: preparing a pipe using steel containing C: 0.05 to less than 0.15%, Si: 0.50% or less, Mn: 0.30 to 2.00%, P: 0.020% or less, S: 0.020% or less, and Al: 0.1% or less and further containing at least one of Mo: 0.50% or less, V: 0.10% or less, Ni: 0.50% or less, Cr: 1.00% or less, Cu: 0.50% or less, Ti: 0.10% or less, Nb: 0.10% or less, and B: 0.005% or less, with the balance being Fe and incidental impurities; quenching the pipe from 850 to 1,000° C.; tempering the resulting pipe at a temperature of 450° C. or higher and lower than Ac1 transformation temperature; cold-working the tempered pipe to prescribed dimensions; and optionally subjecting the cold-worked pipe to annealing. The steel pipe described in Patent Literature 3 may be an electric resistance welded steel pipe or may be a seamless steel pipe. The steel pipe obtained has high dimensional accuracy, is excellent in workability and weldability, has high strength and high toughness, and can be used for accumulators of airbags etc.

PATENT LITERATURE

PTL 1: Japanese Unexamined Patent Application Publication No. 10-140283
PTL 2: Japanese Unexamined Patent Application Publication No. 10-140249
PTL 3: Japanese Unexamined Patent Application Publication No. 10-140250

SUMMARY OF THE INVENTION

Recently, there is a demand for smaller and lighter airbag systems, and their airbag inflators are required to have a high strength, i.e., a tensile strength of 780 MPa or more. To manufacture such a high-strength airbag inflator, it is important that the steel pipe used for the airbag inflator be a high-strength steel pipe that is excellent in workability and can have the above-described high strength after subjected to cold drawing, heat treatment, etc.

The objective of the techniques described in Patent Literatures 1 to 3 is to manufacture a high-strength seamless steel pipe with a tensile strength level of about 590 MPa, and a problem with these techniques is that the above-described high strength cannot be imparted to steel pipes for airbag inflators.

A burst test under hydraulic pressure (water pressure) is required for airbag inflators. The burst test under hydraulic pressure (water pressure) evaluates the strength and ductility of a tubular airbag inflator in its circumferential direction. The airbag inflator fails the test if it undergoes brittle fracture during the test. The airbag inflator must undergo ductile fracture during the test. Therefore, to prevent brittle fracture during the burst test, it is necessary to subject the airbag inflator to heat treatment. From the viewpoint of ensuring strength, quenching and tempering treatment is generally performed.

However, the quenching and tempering treatment has problems such as complexity of the process, a long manufacturing period of time, and an increase in the manufacturing cost of the inflator. Therefore, there is a need for a steel pipe for airbag inflators that can satisfy the desired properties without heat treatment or with simple heat treatment.

In an airbag to be filled with inert gas, the inert gas is charged into an inflator at high pressure. After the charging, the interior of the inflator must be always held at high pressure. Therefore, seamless steel pipes are mainly used as steel pipes for airbags because of their seam reliability. However, these seamless steel pipes are expensive. Recently, from the viewpoint of a further reduction in manufacturing cost, the use of electric resistance welded steel pipes is contemplated.

However, in an electric resistance welded steel pipe, the electric resistance welded portion is rapidly heated and cooled during welding and is more hardened than a base material portion. This causes a problem in that deterioration in low temperature toughness occurs locally only in the electric resistance welded portion. One technique that can address this problem is a post-annealing technique in which only the electric resistance welded portion is locally subjected to heat treatment (annealing) by, for example, induction heating. In this manner, the hardness of the electric resistance welded portion (welded portion) is reduced to close to the hardness of the base material portion. However, this technique has problems such as deterioration in productivity and an increase in manufacturing cost.

It is an object of the present invention to advantageously solve the problems in the conventional techniques and to provide a high-strength welded steel pipe for airbag inflators without heat treatment or with simple heat treatment. The high-strength welded steel pipe is suitable for airbag inflators and has a high tensile strength of 780 MPa or more, toughness high enough to prevent brittle fracture during, for example, a hydraulic burst test, and excellent workability that allows the steel pipe to undergo severe processing such as nosing. It is another object to provide a method for manufacturing the high-strength welded steel pipe.

To achieve the above objects, the present inventors have conducted extensive studies on various factors affecting the strength, toughness, and workability of welded steel pipes. As a result of the studies, the inventors have found a welded steel pipe suitable for airbag inflators. In this welded steel pipe, the content of carbon is relatively low, and a combination of Ti and V is contained within a suitable range. The welded steel pipe has a structure that includes: a fine ferrite phase having an average grain size of 10 μm or less as a main phase; and fine precipitated carbides (Ti, V-based carbides) having an average grain size of 10 nm or less and dispersed in the ferrite phase. The welded steel pipe has the desired high strength and includes a base material portion and a welded portion having no higher hardness than the base material portion. The welded steel pipe including the welded portion has excellent low-temperature toughness and also has excellent workability.

The present invention has been completed by conducting further studies on the basis of the above findings. Aspects of the present invention are summarized as follows:

(1) A high-strength welded steel pipe for airbag inflators, the welded steel pipe including: a tubular base material portion; and a welded portion formed in the base material portion and extending in an axial direction of the base material portion, wherein, the base material portion has a composition containing, in mass %, C: 0.02 to 0.08%, Si: 0.001 to 1.0%,
Mn: 0.1 to 2.0%, P: 0.1% or less,
S: 0.01% or less, Al: 0.01 to 0.1%,
N: 0.01% or less, Ti: 0.01 to 0.20%,
V: 0.01 to 0.50%, and Cr: 0.01 to 0.50%, with the balance including Fe and incidental impurities, the base material portion has a structure that includes a ferrite phase having an average grain size of 10 μm or less at an area fraction of 90% or more and a Ti, V-based carbide having an average grain size of 10 nm or less and dispersed in the ferrite phase, a high tensile strength TS of 780 MPa or more, a strength-elongation balance is TS×El of 15,000 MPa % or more, and the difference ΔHV in Vickers hardness between the base material portion and the welded portion is 60 points or less, and a softened portion has a softened width Ws in a circumferential direction of the welded steel pipe being 0.05 mm or less, the softened portion having a Vickers hardness different from the Vickers hardness of the base material portion by at least 30 points.

(2) The high-strength welded steel pipe for airbag inflators according to (1), wherein the base material portion further contains, in mass %, one or two selected from the following group A and group B:

group A: one or at least two selected from
Cu: 0.001 to 1.0%, Ni: 0.001 to 1.0%,
Nb: 0.001 to 0.05%, W: 0.001 to 0.05%, and
Mo: 0.01 to 1.0%; and
group B: one or two selected from
Ca: 0.02% or less and REM: 0.02% or less.

(3) A method for manufacturing the high-strength welded steel pipe for airbag inflators according to (1) or (2), the method including the steps of: subjecting a steel pipe raw material to cold roll forming to obtain an open pipe; abutting end surfaces of the open pipe against each other; and joining the end surfaces to each other by laser welding to thereby form the base material portion and the welded portion.

(4) The method for manufacturing the high-strength welded steel pipe for airbag inflators according to (3), the method further including the steps of: after the joining by the laser welding, subjecting the steel pipe to cold drawing.

(5) The method for manufacturing the high-strength welded steel pipe for airbag inflators according to (4), wherein a reduction in area in the cold drawing is 5 to 50%.

(6) The method for manufacturing the high-strength welded steel pipe for airbag inflators according to (5), the method further including the steps of: after the cold drawing, subjecting the resulting steel pipe to annealing by heating the steel pipe to a heating temperature of 800° C. or lower.

The present invention allows a high-strength welded steel pipe for airbag inflators to be easily manufactured at low cost without heat treatment or with simple heat treatment, and industrially significant effects are thereby obtained. The welded steel pipe is suitable for airbag inflators and has a high tensile strength of 780 MPa or more, toughness high enough to prevent brittle fracture during, for example, a hydraulic burst test, and excellent workability that allows the steel pipe to undergo severe processing such as nosing. The high-strength welded steel pipe according to the present invention is suitable for airbag inflators and also for applications such as automobile components and building components.

DETAILED DESCRIPTION OF THE INVENTION

Figure 1:
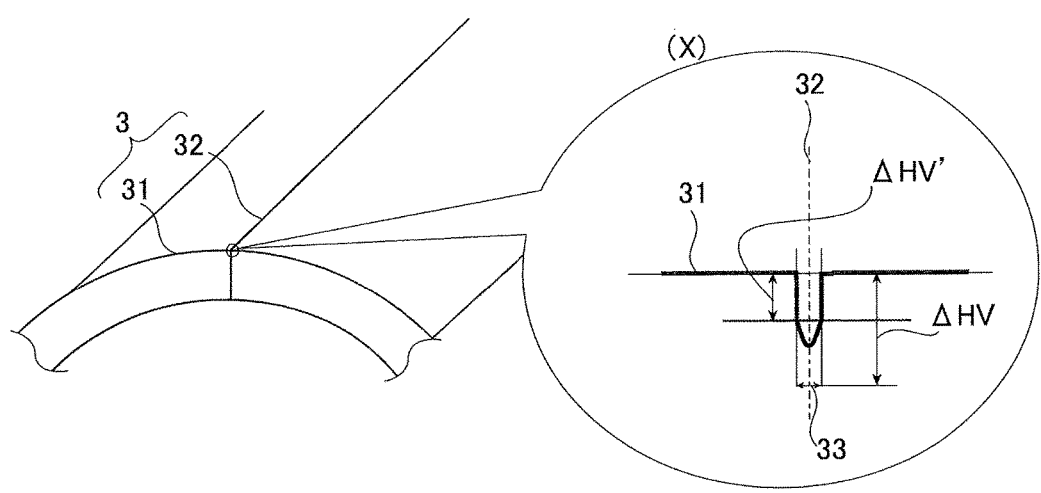
FIG. 1 is an illustration for describing a base material, a welded portion, and a softened portion of the welded steel pipe according to aspects of the present invention.

A welded steel pipe, according to aspects of the present invention, may be manufactured by subjecting a steel pipe raw material (steel sheet) to cold roll forming to obtain an open pipe, abutting end surfaces of the open pipe against each other, and then joining the end surfaces to each other by welding. The welded steel pipe may include a tubular base material portion and a welded portion formed in the base material portion and extending in the axial direction of the base material portion (the extending direction of the pipe). The base material portion of the welded steel pipe in one embodiment of the present invention has a composition containing, in mass %, C: 0.02 to 0.08%, Si: 0.001 to 1.0%, Mn: 0.1 to 2.0%, P: 0.1% or less, S: 0.01% or less, Al: 0.01 to 0.1%, N: 0.01% or less, Ti: 0.01 to 0.20%, V: 0.01 to 0.50%, and Cr: 0.01 to 0.50%, with the balance being Fe and incidental impurities. The open pipe is a roll-shaped steel pipe to be subjected to welding. The pipe has opposite circumferential ends spaced apart from each other and therefore has an opening.

First, a description will be given of the reasons for the limitations on the composition of the welded steel pipe according to aspects of the present invention. In the following description, % by mass in the composition is denoted simply by %, unless otherwise specified.

C: 0.02 to 0.08%

C is an element that contributes to strengthening of the steel through solid solution strengthening or is bonded to Ti and V to form fine carbides and contributes to strengthening of the steel through precipitation strengthening. To obtain this effect to thereby ensure the desired structure and high strength, the content of C is 0.02% or more. If the content of C is less than 0.02%, crystal grains in the welded portion tend to become coarse. In this case, low-temperature toughness deteriorates, and this may cause nonuniform deformation. If the content of C is excessively large, i.e., more than 0.08%, the hardness of the welded portion increases significantly, and this may cause deterioration in the workability and low-temperature toughness of the welded portion. Therefore, the range of the content of C may be limited to 0.02 to 0.08%. Preferably, the content of C is 0.02 to 0.07%.

Si: 0.001 to 1.0%

Si is an element that improves the strength of the steel through solid solution strengthening. To obtain this effect to thereby ensure the desired high strength, the content of Si is 0.001% or more. If the content of Si is excessively large, i.e., more than 1.0%, the weldability deteriorates significantly. Therefore, the range of the content of Si may be limited to 0.001 to 1.0%. Preferably, the content of Si is 0.001 to 0.5%.

Mn: 0.1 to 2.0%

Mn is an element that increases the strength of the steel through solid solution strengthening. To obtain this effect to thereby ensure the desired high strength, the content of Mn is 0.1% or more. If the content of Mn is less than 0.1%, the desired high strength cannot be ensured. If the content of Mn is excessively large, i.e., more than 2.0%, the low temperature toughness deteriorates, and further the weldability deteriorates significantly. In addition, the risk of an increase in the amount of defects due to center segregation increases. Therefore, the range of the content of Mn may be limited to 0.1 to 2.0%. The content of Mn is preferably 0.1 to 1.5% and more preferably 0.1 to 1.0%.

P: 0.1% or Less

P is an element that effectively contributes to strengthening. For the purpose of strengthening, it is preferable that the content of P is 0.001% or more. If the content of P is excessively large, i.e., more than 0.1%, the weldability deteriorates significantly. Therefore, in an embodiment of the present invention, the content of P is limited to 0.1% or less. If the strengthening by P is not necessary, it is preferable in terms of weldability that the content of P is limited to 0.05% or less. In this case, the content of P is more preferably 0.04% or less.

S: 0.01% or Less

S is present in the steel as non-metallic inclusions (sulfides), and cracks may start from these non-metallic inclusions during forming such as bending or pipe expansion. Therefore, in the present invention, it is preferable that the content of S is as small as practically possible. When the content of S is 0.01% or less, its adverse effects are small. Therefore, the content of S may be limited to 0.01% or less. For applications that require a further improvement in workability, the content of S is preferably 0.005% or less and more preferably 0.0010% or less.

Al: 0.01 to 0.1%

Al is an element that acts as a deoxidizer and is effective in suppressing coarsening of the crystal grains. To obtain these effects, the content of Al is 0.01% or more. If the content of Al exceeds 0.1%, the amount of oxide-based inclusions increases. In this case, cleanliness deteriorates, and ductility and toughness deteriorate. Therefore, the content of Al may be limited to 0.1% or less. Preferably, the content of Al is 0.01 to 0.05%.

N: 0.01% or Less

N is an element that is bonded to Al, precipitates as AlN, and contributes to a reduction in size of the crystal grains. To obtain this effect, it is preferable that the content of N is 0.001% or more. If the content of N exceeds 0.01%, the ductility deteriorates. Therefore, the content of N may be limited to 0.01% or less. Preferable, the content of N is 0.001 to 0.006%.

Ti: 0.01 to 0.20%

Ti is an element that is bonded to C, precipitates as fine TiC in the steel, and contributes to strengthening of the steel through precipitation strengthening. Ti is a very important element with regard to aspects of the present invention. To obtain this effect, the content of Ti is 0.01% or more. If the content of Ti is excessively large, i.e., exceeds 0.20%, oxide is formed, and this causes deterioration in electric resistance weldability and ductility. Therefore, the content of Ti may be limited to 0.01 to 0.20%. Preferably, the content of Ti is 0.01 to 0.10%.

V: 0.01 to 0.50%

V is an element that is bonded to C, precipitates as fine VC in the steel, and contributes to strengthening of the steel through precipitation strengthening, as does Ti. V is a very important element with regards to aspects of the present invention. To obtain this effect, the content of V is 0.01% or more. If the content of V exceeds 0.50%, the ductility deteriorates, and the cost of materials increases. Therefore, the range of the content of V may be limited to 0.01 to 0.50%. Preferably, the content V is 0.01 to 0.04%.

Cr: 0.01 to 0.50%

Cr is an element that contributes to strengthening of the steel through solid solution strengthening. To obtain this effect, the content of Cr is 0.01% or more. If the content of Cr exceeds 0.50%, ductility, weldability, hot workability, and cold workability deteriorate. Therefore, the range of the content of Cr may be limited to 0.01 to 0.50%.

The components described above are basic components. In an embodiment of the present invention, in addition to the basic composition, one or more components selected from the following group A and group B may be selected and contained as an optional element as needed.

Group A: one or at least two selected from Cu: 0.001 to 1.0%, Ni: 0.001 to 1.0%, Nb: 0.001 to 0.05%, W: 0.001 to 0.05%, and Mo: 0.01 to 1.0%.

Group B: one or two selected from Ca: 0.02% or less and REM: 0.02% or less.

Group A: One or at Least Two Selected from Cu: 0.001 to 1.0%, Ni: 0.001 to 1.0%, Nb: 0.001 to 0.05%, W: 0.001 to 0.05%, and Mo: 0.01 to 1.0%

Each of the elements in the group A: Cu, Ni, Nb, W, and Mo contributes to strengthening of the steel and may be selected and contained as needed.

Cu, Ni, and Mo are elements that contribute to strengthening of the steel through solid solution strengthening and may be selected and contained as needed. To obtain this effect, the content of Cu is 0.001% or more, the content of Ni is 0.001% or more, and the content of Mo is 0.01% or more. If the content of Cu exceeds 1.0%, the content of Ni exceeds 1.0%, or the content of Mo exceeds 1.0%, ductility, weldability, hot workability, and cold workability deteriorate, and the large contents are economically disadvantageous. Therefore, when any of Cu, Ni, and Mo is contained, it is preferable that the range of the content of Cu is limited to 0.001 to 1.0%, the range of the content of Ni is limited to 0.001 to 1.0%, and the range of the content of Mo is limited to 0.01 to 1.0%. More preferably, the content of Cu is 0.01 to 0.5%, the content of Ni is 0.01 to 0.5%, and the content of Mo is 0.01 to 0.5%.

Nb and W are bonded to C, precipitate as NbC and WC in the steel, and contribute to strengthening of the steel through precipitation strengthening. To obtain this effect, the content of Nb is 0.001% or more, and the content of W is 0.001% or more. If the content of Nb exceeds 0.05% or the content of W exceeds 0.05%, the ductility deteriorates. Therefore, when any of Nb and W is contained, it is preferable that the range of the content of Nb is limited to 0.001 to 0.05% and the range of the content of W is limited to 0.001 to 0.05%. More preferably, the content of Nb is 0.001 to 0.03%, and the content of W is 0.001 to 0.03%.

Group B: One or Two Selected from Ca: 0.02% or Less and REM: 0.02% or Less

Each of the elements in the group B: Ca and REM functions to form spherical non-metallic inclusions (carbides), contributes to an improvement of ductility, and may be selected and contained as needed. To obtain this effect, it is preferable that the content of Ca is 0.002% or more and the content of REM is 0.002% or more. If the content of Ca is excessively large, i.e., exceeds 0.02%, or the content of REM is excessively large, i.e., exceeds 0.02%, the amount of non-metallic inclusions becomes excessively large. In this case, the cleanliness deteriorates, and the ductility and toughness rather deteriorate. Therefore, when any of Ca and REM is contained, it is preferable that the content of Ca is limited to 0.02% or less and the content of REM is limited to 0.02% or less. When both Ca and REM are used in combination, it is preferable that the total content of Ca and REM is 0.03% or less.

The balance other than the components described above is Fe and incidental impurities.

The base material portion of the welded steel pipe, according to an aspect of the present invention, has the above-described composition and has a structure that includes a ferrite phase having an average grain size of 10 µm or less as a main phase and Ti, V-based carbides having an average grain size of 10 nm or less and dispersed in the ferrite phase.

The "main phase" as used herein is a phase with an area fraction of 90% or more with respect to the entire structure. In an embodiment of the present invention, the main phase is the fine ferrite phase having an average grain size of 10 µm or less. Examples of a second phase other than the main phase include pearlite.

If the crystal grain size of the ferrite phase is larger than 10 µm, the strength and toughness deteriorate, and the desired high strength and high toughness cannot be ensured. Therefore, the average crystal grain size of the ferrite phase may be limited to 10 µm or less.

In accordance with one aspect of the present invention, the identification of the structure and the measurement of structure fractions and the crystal grain size may be performed as follows. The structure is observed under an optical microscope (magnification: 400×) or a scanning electron microscope (magnification: 2,000×), and an image of the structure is taken. Then the image is subjected to image processing. In one embodiment the present invention, the desired structure is a structure in which fine Ti, V-based carbides are uniformly dispersed in the ferrite phase. To suppress the formation of pearlite, the content of C is reduced. To suppress the coarsening of the Ti, V-based carbides and to suppress the formation of pearlite, coiling temperature is controlled so as not to exceed 700° C. The desired structure described above is obtained in the manner described above.

The base material portion of the welded steel pipe, according to an aspect of the present invention, has the structure in which the Ti, V-based carbides having an average grain size of 10 nm or less are dispersed in the fine ferrite phase. If the Ti, V-based carbides are coarsened such that their average grain size exceeds 10 nm, the degree of precipitation strengthening decreases, and the desired high strength cannot be ensured. The "Ti, V-based carbides" are complex carbides containing Ti and V, i.e., Ti—V-based complex carbides.

In an aspect the present invention, the elements contained are identified using an energy dispersive x-ray spectrometer (EDX), and the average grain size of the Ti, V-based carbides can be measured by measuring their area. In an aspect the present invention, the average grain size of the Ti, V-based carbides can be controlled by adjusting the coiling temperature so as not to exceed 700° C.

The complex carbides are formed as fine precipitates. Therefore, high strength can be ensured without deterioration in workability. The complex carbides are thermally stable. Therefore, even when the steel pipe is heated and annealed at a temperature of 800° C. or lower after the steel pipe is subjected to cold drawing or processed into a part shape, the steel pipe is not significantly softened. Since the amount of carbon is controlled to be low, the increase in hardness of the welded portion is small, and the difference in hardness between the base material portion and the welded portion can be reduced.

In a welded steel pipe according to an embodiment of the present invention, the base material portion has the composition described above and the structure described above. The welded steel pipe has a high tensile strength TS of 780 MPa or more and a strength-elongation balance TS×El of 15,000 MPa % or more. The welded steel pipe has a softened portion having Vickers hardness different from the Vickers hardness of the base material portion by at least 30 points, and the softened width Ws of the softened portion in the circumferential direction of the pipe is 0.05 mm or less. Therefore, in the welded steel pipe in accordance with an embodiment of the present invention, the difference ΔHV in Vickers hardness between the base material portion and the welded portion is 60 points or less. In a hydraulic burst test on the pipe and a weight-drop test in which a weight of 5 kgf is dropped from a height of 2.0 m onto a halved steel pipe at a test temperature of −60° C., the fracture mode of the steel pipe is ductile.

Next, the reasons for the limitations on the mechanical properties described above will be described.

Tensile Strength TS: 780 MPa or More and Strength-Elongation Balance TS×El: 15,000 MPa % or More If the tensile strength TS of the welded steel pipe is less than 780 MPa, the pressure resistance required for airbag inflators cannot be ensured. If the TS×El is less than 15,000 MPa %, it is difficult to achieve both high strength and excellent workability simultaneously, and it is difficult to allow the welded steel pipe to undergo forming, such as nosing of an end of the pipe, necessary for producing an airbag inflator. Therefore, it is necessarily advantageous for the welded steel pipe for airbag inflators to have a tensile strength TS of 780 MPa or more and a strength-elongation balance TS×El of 15,000 MPa % or more.

In the present invention, the tensile strength TS and the elongation El may be measured as follows. A JIS No. 12A test piece according to the specifications of JIS Z 2241 is taken from a pipe product (welded steel pipe) such that the lengthwise direction of the pipe is parallel to a tensile direction, and a tensile test is performed according to the specifications of JIS Z 2241. In one embodiment of the present invention, the desired tensile strength TS can be obtained by optimizing the content of Ti and the content of V and setting the coiling temperature to 700° C. or lower to thereby allow the Ti, V-based carbides having an average grain size of 10 nm or less to be uniformly dispersed. The desired elongation El can be obtained by reducing the content of C and setting the coiling temperature to 700° C. or lower to thereby suppress the formation of pearlite so that the ferrite phase serves as the main phase.

Difference ΔHV in Hardness Between the Base Material Portion and the Welded Portion: 60 Points or Less If the welded portion is harder than the base material portion, i.e., if the difference in hardness between the base material portion and the welded portion is large, forming of the pipe is adversely affected, and the low-temperature toughness of the welded portion deteriorates, so that the function of an airbag inflator may deteriorate. Therefore, the difference ΔHV in Vickers hardness HV between the base material portion and the welded portion must be 60 points or less. The hardness of the base material portion is the average hardness HVm in a region not affected by welding heat. Specifically, the hardness may be measured at five points located in a region not affected by welding heat and spaced at least 10 nm from the welded portion in the circumferential direction of the pipe, and the average of the measurements may be used as the average hardness HVm. Let the maximum hardness of the welded portion be HVmax, and the minimum hardness of the welded portion be HVmin. Then ΔHV=|HVmax−HVm| or ΔHV=|HVm−HVmin| is used as the difference ΔHV in hardness between the base material portion and the welded portion. Both |HVmax−HVm| and |HVm−HVmin| are limited to 60 points or less.

When the tensile strength TS is 780 MPa or more and less than 980 MPa, it is preferable that ΔHV is 30 or less. When the tensile strength TS is 980 MPa or more, it is preferable that ΔHV is 60 points or less.

The Vickers hardness HV may be measured using a Vickers hardness meter (test force: 4.9 N) in a region extending 5 mm from the center of the welded portion toward opposite sides at 0.2 mm intervals in the circumferential direction. In the present invention, the Vickers hardness HV may be controlled to the desired value in the following manner. The amount of C is reduced to obtain a structure including ferrite as a main phase, and hardening of the welded portion is thereby suppressed. Moreover, laser welding with low heat input that allows the width of heating to be small is used to suppress softening of the welded portion caused by heating.

The softened width Ws, in the circumferential direction of the pipe, of the softened portion having Vickers hardness different from the Vickers hardness of the base material portion by at least 30 points is 0.05 mm or less.

FIG. 1 will be referred to for description of the softened portion. FIG. 1 is an illustration for describing the base material 31, the welded portion 32, and the softened portion 33 of the welded steel pipe 3 according to an aspect of the present invention. As shown in FIG. 1, the welded steel pipe 3, according to an embodiment of the present invention, includes the base material 31 and the welded portion 32. In FIG. 1, (X) conceptually shows changes in the Vickers hardness of the welded steel pipe 3 in the circumferential direction of the pipe. The welded steel pipe 3 has the softened portion 33, and the softened portion 33 is a region in which the difference ΔHV' in Vickers hardness between this region and the base material portion 31 is at least 30 points.

In precipitation strengthened steel, like the steel used in one embodiment of the present invention, in which very fine carbides of nanometer size are dispersed, if the softened width Ws of the softened portion 33 formed around the welded portion 32 is more than 0.05 mm, the carbides in the welded portion 32 are coarsened during welding, and this causes a reduction in strength. In particular, the strength desired for bottles for airbags is not obtained. Therefore, in an embodiment of the present invention, the softened width Ws is 0.05 mm or less. The softened width Ws is the width, in the circumferential direction of the pipe, of the softened portion 33 in which the difference ΔHV' in Vickers hardness between the softened portion 33 and the base material portion 31 is at least 30 points. In the following description, the reference numerals of the welded steel pipe, base material, welded portion, and softened portion will be omitted, unless the figure is referred to.

In aspects of the present invention, the softened width Ws can be controlled to the desired value, i.e., 0.05 mm or less, by abutting the end surfaces of the open pipe against each other and joining the end surfaces by laser welding.

Fracture Modes in Hydraulic Burst Test and Weight-Drop Test: Ductile Fracture

In the hydraulic burst test, a hydroform testing machine is used to burst the welded steel pipe by increasing water pressure. After the test, the fracture surfaces of the pipe are observed. When no brittle fracture is observed in the fracture surfaces (only ductile fracture is observed), the welded steel pipe is rated pass.

In the weight-drop test, the welded steel pipe is cut into halves to obtain a halved test steel pipe with a semicircular shape. A V-notch having a depth of 0.5 mm is formed in an upper portion on the inner surface of the test steel pipe so as to extend in the lengthwise direction of the pipe, and this test steel pipe is used. The V-notch is 45° and has a tip radius of 0.25 mm. The halved test steel pipe is cooled to a test temperature of −60° C. and placed so as to be convex upward, and a weight (5 kgf) is dropped onto the test steel pipe from a height of 2.0 m. The fracture surfaces are observed after the test. When no brittle fracture is observed in the fracture surfaces, the test steel pipe is rated pass.

In the above tests, when the fracture surfaces are ductile, the test steel pipe is considered to have the pressure resistance and high toughness required for airbag inflators.

The above-described welded steel pipe is subjected to cold drawing at least once, then optionally subjected to intermediate heat treatment, and subjected to forming such as nosing of end portions of the pipe to thereby obtain an airbag inflator.

Therefore, the welded steel pipe subjected to the cold drawing must satisfy the above-described mechanical properties. The cold drawing is generally performed at a reduction in area of 5 to 50% or less. The welded steel pipe for airbag inflators must meet the above-described mechanical properties even after the pipe is subjected to cold drawing at a reduction in area of 5 to 50%. In the cold drawing, a large-outer diameter steel pipe is drawn into a small-outer diameter steel pipe at room temperature. With the cold drawing, the dimensional accuracy of the steel pipe can be improved, the smoothness of the surface skin of the steel pipe can be improved, and the strength can be improved.

Next, a preferred method for manufacturing the welded steel pipe according to an aspect of the present invention will be described.

Figure 2:
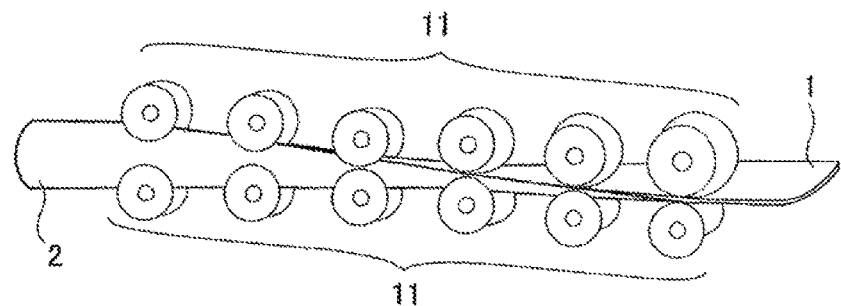
FIG. 2 shows illustrations of an example of a process for manufacturing a welded steel pipe in accordance with aspects of the present invention.
Figure 2:
Figure 2:
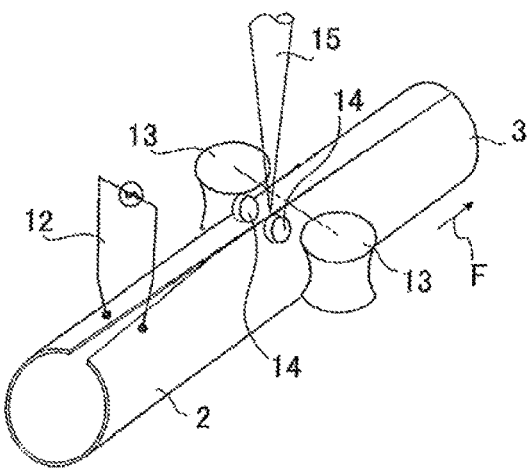
Figure 2:
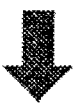
Figure 2:
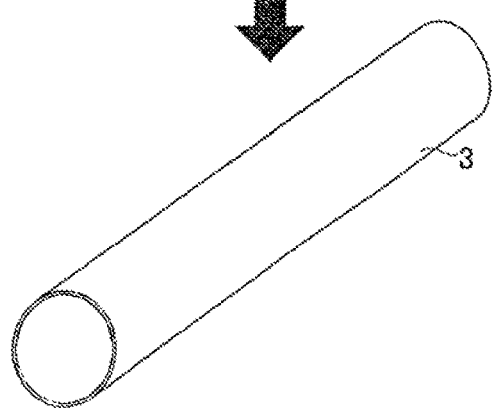

FIG. 2 shows illustrations of an example of a process for manufacturing the welded steel pipe 3 in accordance with an embodiment of the present invention. As shown in FIG. 2, in the method for manufacturing the welded steel pipe 3 according to an embodiment of the present invention, first, a forming machine 11 is used to subject a steel pipe raw material (steel sheet) 1 to cold roll forming to produce an open pipe 2 (step S1). Next, the open pipe 2 is moved in the direction of an arrow F by guide rolls 14 and squeeze rolls 13 (step S2). Then end surfaces of the open pipe 2 are abutted against each other using the squeeze rolls 13. The abutted portions are heated to their melting point or higher by, for example, induction heating through contact tips 12 and joined to each other by laser welding under laser irradiation 15 (step S2). The welded steel pipe 3 in accordance with an embodiment of the present invention is thereby obtained (step S3). As shown in FIG. 1, the welded steel pipe 3 includes the tubular base material portion 31 and the welded portion 32 formed in the base material portion 31 so as to extend in the axial direction of the base material portion 31 (the extending direction of the pipe), and any ordinary welded steel pipe manufacturing method can be used. In the welded steel pipe 3 in accordance with an embodiment of the present invention, the softened width Ws, in the circumferential direction of the pipe, of the softened portion 33 having a Vickers hardness different from the Vickers hardness of the base material portion 31 by at least 30 points is 0.05 mm or less. In the following description, reference numerals will be omitted.

In a welded steel pipe in accordance with an embodiment of the present invention, the end surfaces of the open pipe are joined to each other by laser welding to thereby form the base material portion and the welded portion. When the laser welding method is used, the softened width Ws of the welded portion can be 0.05 mm or less, and a reduction in the strength of the welded portion can be suppressed.

No particular limitation is imposed on the conditions of the laser welding. However, to reduce the softened width generated by the laser irradiation within a desired range, it is preferable to reduce the focus diameter to increase energy efficiency. In this case, the focus diameter is preferably 0.3 to 0.7 mm, and the energy density is preferably 5 to 15 kW. If the welding speed is low, the width of heating tends to increase. Therefore, the welding speed is preferably 5 to 20 m/min.

To prepare the welded steel pipe for airbag inflators, the welded steel pipe manufactured using the above-described ordinary manufacturing method is further subjected to cold drawing to prepare a pipe product. It is not particularly necessary to limit the cold drawing for preparing the pipe product, so long as a welded steel pipe with the desired dimensions can be produced. From the viewpoint of ensuring dimensional accuracy, it is preferable to perform cold drawing at a reduction in area of 5 to 50% at least once.

In the present invention, after the cold drawing, the steel pipe may be subjected to annealing treatment in which the steel pipe is heated to a heating temperature of 800° C. or lower. The annealing treatment can improve the workability and toughness of the steel pipe.

Any steel sheet can be used as the steel pipe raw material, so long as the steel sheet has the above-described composition and the above-described structure. Any of a hot-rolled steel sheet and an annealed cold-rolled steel sheet prepared by annealing the hot-rolled steel sheet can be preferably used.

A preferred method for manufacturing a hot-rolled steel sheet used as the steel pipe raw material will be described. However, it will be appreciated that the present invention is not limited thereto.

A raw steel material having the composition described above is subjected to a hot rolling step of heating and hot rolling the raw steel material to thereby obtain a hot-rolled steel sheet. It is not particularly necessary to limit the method for manufacturing the raw steel sheet. Preferably, molten steel having the composition described above is produced using an ordinary molten steel manufacturing method such as a converter, and a cast product (raw steel material) such as a slab is manufactured using an ordinary casting method such as a continuous casting method. The cast product may be hot-rolled to prepare a steel piece with prescribed dimensions and shape. This steel piece can be used as the raw steel material without any problem.

The raw steel material having the composition described above is heated, subjected to hot rolling including rough rolling and finishing rolling, cooled after completion of the finishing rolling, and coiled to obtain a hot-rolled steel sheet. Preferably, the heating temperature during the heating is set to 1,100 to 1,350° C., the finishing temperature during the finishing rolling is set to 850° C. or higher and lower than 950° C., and the coiling temperature during the coiling is set to 500 to 700° C.

Heating Temperature: 1,100 to 1,350° C.

Before the hot rolling, the raw steel material must be heated to melt coarse carbides to thereby form a substantially uniform austenite phase. Therefore, preferably, the heating temperature of the raw steel material is 1,100 to 1,350° C. If the heating temperature is lower than 1,100° C., the coarse carbides do not melt. In this case, the amount of fine carbides to be finely dispersed in the cooling and coiling steps after completion of the hot rolling is reduced, and the strength of the final hot-rolled steel sheet and then the strength of the welded steel pipe decrease significantly. If the heating temperature is high, e.g., exceeds 1,350° C., the amount of scale formed increases. In this case, it is feared that a reduction in yield may occur and deterioration of the surface texture of the steel sheet due to scale biting may occur. Therefore, preferably, the range of the heating temperature is limited to 1,100 to 1,350° C. More preferably, the heating temperature is 1,100 to 1,250° C.

Finishing Temperature: 850° C. or Higher and Lower than 950° C.

If the finishing temperature is lower than 850° C., ferrite transformation substantially starts during the finishing rolling. Therefore, the ferrite grains are stretched, and part of the ferrite grains grow, so that a duplex grain structure is formed. In this case, the desired structure in which the main phase is a fine ferrite phase cannot be ensured. If the finishing temperature is 950° C. or higher, the surface texture of the steel sheet deteriorates. Therefore, preferably, the finishing temperature is 850° C. or higher and lower than 950° C.

Coiling Temperature: 500 to 700° C.

If the coiling temperature is lower than 500° C., a sufficient amount of fine carbides cannot be obtained, and the strength of the steel sheet is deteriorated. If the coiling temperature is high, e.g., exceeds 700° C., the precipitated carbides are coarsened, and the strength of the steel sheet is deteriorated. Therefore, preferably, the coiling temperature is 500 to 700° C. More preferably, the coiling temperature is 650° C. or lower.

By appropriately controlling the composition and the manufacturing conditions as described above, the hot-rolled steel sheet can have the above-described structure, e.g., the structure including the ferrite phase having an average grain size of 10 μm or less as the main phase and the Ti, V-based carbides having an average grain size of 10 nm or less and dispersed in the ferrite phase. However, it will be appreciated that, in aspects of the present invention, the manufacturing conditions are not limited to those described above.

EXAMPLES

Next, embodiments of the present invention will be further described by way of Examples.

Molten steel having a composition shown in Table 1 was produced in a converter and cast into a slab (raw steel material) (thickness: 200 mm) using a continuous casting method. The raw steel material obtained was heated to a heating temperature shown in Table 2, subjected to a hot rolling under conditions shown in Table 2, cooled under conditions shown in Table 2 after completion of the hot rolling (finishing rolling) and coiled at a coiling temperature shown in Table 2 to form a hot-rolled steel sheet.

Each hot-rolled steel sheet was used as a steel pipe raw material. The steel pipe raw material was subjected to cold roll forming to obtain an open pipe, and end surfaces of the open pipe were abutted against each other, heated to its melting point or higher by induction heating, and joined to each other by laser welding to thereby obtain a welded steel pipe (outer diameter: 70.0 mm φ) (a pipe product). A steel pipe No. 18 was subjected to cold drawing (reduction in area: 13.7%) to obtain a pipe product (φ67×t 1.8 mm).

Test pieces were taken from each of the obtained pipe products, and a structure observation test, a tensile test, and a welded portion hardness test were performed. The test methods are as follows.

(1) Structure Observation Test

A test piece for structure observation was taken from the base material portion of each of the obtained pipe products (welded steel pipes) such that a cross section (C-cross section) orthogonal to the axial direction of the pipe served as an observation surface, and the observation surface was polished and etched (nital etching). The structure was observed under an optical microscope (magnification: 400×) or a scanning electron microscope (magnification: 2,000×), and photographs of the structure were taken. The photographs were taken in at least ten fields of view. The obtained photographs of the structure were subjected to image processing to identify the structure and measure the structure fractions and the crystal grain size. The average grain size of the ferrite phase was determined as follows. The areas of the ferrite phase grains were measured and converted to circle equivalent diameters, and the circle equivalent diameters were used as the diameters of the grains. The average of the diameters was used as the average grain size of the ferrite phase in the steel pipe.

A specimen for a thin film was taken from the base material portion of each of the obtained pipe products (welded steel pipes) in which a central position of base material portion in the thickness direction served as an observation surface. The specimen was mechanically polished and electrolytically polished to prepare a thin film, and then a transmission electron microscope (magnification: 500,000×) was used to identify the types of precipitates and measure the size (grain size) of the precipitates. The types of the precipitates were determined by identifying elements contained using an energy dispersive X-ray spectrometer (EDX) mounted on the transmission electron microscope, and the precipitates were found to be Ti, V-based carbides. The grain size of the precipitates was determined as follows. The areas of the precipitate grains were measured, and their circle equivalent diameters were computed from the areas and used as the diameters of the precipitate grains. The arithmetic mean of the diameters was used as the average grain size of the precipitates in the steel pipe.

(2) Tensile Test

A JIS No. 12A test piece according to the specifications of JIS Z 2241 was taken from each of the obtained pipe products (welded steel pipes) such that the lengthwise direction of the pipe was parallel to a tensile direction, and a tensile test was performed according to the specifications of JIS Z 2241 to determine tensile characteristics (tensile strength TS and elongation El).

(3) Welded Portion Hardness Test

A hardness test specimen including the base material portion and the welded portion was taken from each of the obtained pipe products (welded steel pipes) such that a cross section orthogonal to the lengthwise direction of the pipe served as a measurement surface, and the measurement surface was polished. The Vickers hardness HV was measured using a Vickers hardness meter (test force: 4.9 N) in a region extending 5 mm from the center of the welded portion toward opposite sides at 0.2 mm intervals in the circumferential direction. The average hardness HVm in a region not affected by welding heat (the hardness of the base material portion) and the maximum hardness HVmax and minimum hardness HVmin of the welded portion were determined, and the difference ΔHV in hardness between the base material portion and the welded portion was computed. ΔHV was computed using one of the following formulas:

ΔHV=|HVmax−HV*m*| and ΔHV=|HV*m*−HVmin|.

Test pieces (steel pipes) were taken from each of the obtained pipe products (welded steel pipes) and were subjected to a hydraulic burst test and a weight-drop test to evaluate pressure resistance and toughness. The test methods are as follows.

(4) Hydraulic Burst Test

A test piece (steel pipe) (length: 600 mm) was taken from each of the obtained pipe products (welded steel pipes). Both ends of the test piece (steel pipe) were covered with sleeves having a width of 100 mm to prevent pipe expansion, and the effective length of the test was thereby adjusted to 400 mm. A solid closure member was welded to one end of the test piece (steel pipe), and a closure member through which a high-pressure hose passed was welded to the other end. The resulting test piece (steel pipe) was attached to a hydroform testing machine, and the hydraulic burst test was performed. Specifically, water was injected into the pipe through the high-pressure hose to increase the internal pressure to thereby burst (rupture) the test piece. After the rupture, the fracture surfaces were observed to check the presence or absence of brittle fracture. Three test pieces were used (the number of repetitions: 3). When no brittle fracture was observed in the three repetitions of the test, the test pieces were rated "good." When brittle fracture was observed in all the three repetitions of the test, the test pieces were rated "poor." In other cases, the test pieces were rated "fair."

(5) Weight-Drop Test

A test piece (steel pipe) was taken from each of the obtained pipe products (welded steel pipes) and cut into halves with a semicircular shape. A V-notch having a depth of 0.5 mm was formed in an upper portion on the inner surface of the halved test piece so as to extend in the lengthwise direction of the pipe to thereby prepare a test specimen. The V-notch was 45° and had a tip radius of 0.25 mm. In the weight-drop test performed, the halved test specimen having a semicircular shape was cooled to a test temperature of −60° C. and placed so as to be convex upward, and a weight (5 kg) was dropped onto the test specimen from a height of 2.0 m. Three test specimens were used (number of repetitions: 3). After the test, the fracture surfaces were visually observed to check the presence or absence of brittle fracture. When no brittle fracture was observed in the three repetitions of the test, the test specimens were rated "good." When brittle fracture was observed in all the three repetitions of the test, the test specimens were rated "poor." In other cases, the test specimens were rated "fair."

A test piece (steel pipe) was taken from each of the obtained pipe products (welded steel pipes), and a spinning test was performed to evaluate workability. The test method is as follows.

(6) Spinning

A test piece (steel pipe) was taken from each of the obtained pipe products (welded steel pipes) and subjected to spinning. In the spinning, the outer diameter of an end of the pipe was reduced to 50 mm. After the spinning, cracking in the processed portion was visually checked. When no cracking was observed, the test piece was rated "good." When cracking was observed, the test piece was rated "poor."

The results obtained are shown in Table 3.

TABLE 1

| Steel No. | Chemical component (% by mass) | | | | | | | | | | Group A: Cu, Ni, Nb, W, Mo | Group B: Ca, REM | Remarks |
|---|---|---|---|---|---|---|---|---|---|---|---|---|---|
| | C | Si | Mn | P | S | Al | N | Ti | V | Cr | | | |
| A | 0.05 | 0.1 | 1.40 | 0.01 | 0.001 | 0.035 | 0.002 | 0.091 | 0.10 | 0.10 | — | — | Compatible Example |
| B | 0.05 | 0.1 | 1.35 | 0.01 | 0.001 | 0.035 | 0.002 | 0.092 | 0.10 | 0.10 | Nb: 0.01 | — | Compatible Example |
| C | 0.05 | 0.1 | 1.35 | 0.01 | 0.001 | 0.035 | 0.002 | 0.091 | 0.10 | 0.10 | — | Ca: 0.001 | Compatible Example |
| D | 0.05 | 0.1 | 1.35 | 0.01 | 0.001 | 0.035 | 0.002 | 0.093 | 0.10 | 0.10 | Cu: 0.1 | REM: 0.001 | Compatible Example |
| E | 0.05 | 0.1 | 1.35 | 0.01 | 0.001 | 0.035 | 0.002 | 0.015 | 0.11 | 0.10 | — | Ca: 0.0030 | Compatible Example |
| F | 0.05 | 0.1 | 1.50 | 0.01 | 0.001 | 0.035 | 0.002 | 0.150 | 0.11 | 0.10 | Cu: 0.1, Ni: 0.1 | — | Compatible Example |
| G | 0.07 | 0.1 | 1.30 | 0.01 | 0.001 | 0.035 | 0.002 | 0.091 | 0.12 | 0.10 | — | — | Compatible Example |
| H | 0.05 | 0.1 | 2.10 | 0.01 | 0.001 | 0.035 | 0.002 | 0.091 | 0.10 | 0.10 | — | — | Comparative Example |
| I | 0.05 | 0.1 | 1.20 | 0.01 | 0.001 | 0.035 | 0.002 | 0.250 | 0.10 | 0.10 | — | — | Comparative Example |
| J | 0.05 | 0.1 | 1.20 | 0.01 | 0.001 | 0.035 | 0.002 | 0.008 | — | 0.001 | — | — | Comparative Example |
| K | 0.05 | 0.1 | 1.20 | 0.01 | 0.001 | 0.035 | 0.002 | 0.100 | 0.60 | 0.10 | — | — | Comparative Example |
| L | 0.05 | 0.1 | 2.80 | 0.01 | 0.001 | 0.035 | 0.002 | 0.105 | 0.01 | 0.10 | — | — | Comparative Example |

TABLE 2

| Steel pipe No. | Steel No. | Heating Heating temperature (° C.) | Hot rolling Finishing temperature (° C.) | Coiling Coiling temperature (° C.) | Hot-rolled sheet Sheet thickness (mm) | Focal diameter (mm) | Welding: laser conditions Energy density (output power) (kW) | Welding speed (m/min) |
|---|---|---|---|---|---|---|---|---|
| 1 | A | 1250 | 900 | 600 | 2.0 | 0.5 | 10 | 10 |
| 2 | B | 1250 | 900 | 600 | 2.0 | 0.5 | 10 | 10 |
| 3 | C | 1250 | 900 | 600 | 2.0 | 0.5 | 10 | 10 |
| 4 | D | 1250 | 900 | 600 | 2.0 | 0.5 | 10 | 10 |
| 5 | E | 1250 | 890 | 600 | 2.0 | 0.5 | 10 | 10 |
| 6 | F | 1250 | 900 | 600 | 2.0 | 0.5 | 10 | 10 |
| 7 | G | 1250 | 900 | 600 | 2.0 | 0.5 | 10 | 10 |
| 8 | H | 1250 | 920 | 600 | 2.0 | 0.5 | 10 | 10 |
| 9 | I | 1250 | 900 | 600 | 2.0 | 0.5 | 10 | 10 |
| 10 | J | 1250 | 900 | 650 | 2.0 | 0.5 | 10 | 10 |
| 11 | K | 1250 | 900 | 600 | 2.0 | 0.5 | 10 | 10 |
| 12 | L | 1250 | 900 | 580 | 2.0 | 0.5 | 10 | 10 |
| 13 | A | 1250 | 900 | 600 | 2.0 | 0.5 | 10 | 10 |
| 14 | A | 1250 | 800 | 600 | 2.0 | 0.5 | 10 | 10 |
| 15 | A | 1250 | 960 | 600 | 2.0 | 0.5 | 10 | 10 |
| 16 | A | 1250 | 900 | 480 | 2.0 | 0.5 | 10 | 10 |
| 17 | A | 1250 | 900 | 750 | 2.0 | 0.5 | 10 | 10 |
| 18 | A | 1250 | 900 | 750 | 2.0 | 0.5 | 10 | 10 |

TABLE 3

| Steel pipe No. | Steel No. | Structure Type* | Area fraction of F phase (%) | Average ferrite grain size (μm) | Carbide Type | Carbide Average grain size (nm) | Tensile strength TS (MPa) | Elongation El (%) | Strength-elongation balance TS × El (MPa %) |
|---|---|---|---|---|---|---|---|---|---|
| 1 | A | F + P | 99 | 3 | Ti-V based | 3 | 800 | 21 | 16800 |
| 2 | B | F + P | 99 | 3 | Ti-V based | 3 | 820 | 22 | 18040 |
| 3 | C | F + P | 99 | 4 | Ti-V based | 2 | 800 | 23 | 18400 |
| 4 | D | F + P | 99 | 3 | Ti-V based | 3 | 830 | 22 | 18260 |
| 5 | E | F + P | 99 | 4 | Ti-V based | 2 | 800 | 24 | 19200 |
| 6 | F | F + P | 99 | 4 | Ti-V based | 3 | 810 | 22 | 17820 |
| 7 | G | F + P | 99 | 4 | Ti-V based | 4 | 810 | 23 | 18630 |
| 8 | H | F + P | 99 | 3 | Ti-V based | 3 | 820 | 20 | 16400 |
| 9 | I | F + P | 99 | 4 | Ti-V based | 3 | 790 | 21 | 16590 |
| 10 | J | F + B | 99 | 5 | Ti-V based | 14 | 730 | 20 | 14600 |
| 11 | K | F + B | 99 | 4 | Ti-V based | 15 | 790 | 14 | 11060 |
| 12 | L | F + B | 99 | 5 | Ti-V based | 15 | 740 | 19 | 14060 |
| 13 | A | F + B | 99 | 4 | Ti-V based | 5 | 800 | 14 | 11200 |
| 14 | A | F + B | 99 | 4 | Ti-V based | 15 | 730 | 20 | 14600 |
| 15 | A | F + B | 99 | 3 | Ti-V based | 3 | 780 | 18 | 14040 |
| 16 | A | F + B | 99 | 5 | Ti-V based | 20 | 760 | 19 | 14440 |
| 17 | A | F + B | 99 | 3 | Ti-V based | 15 | 750 | 18 | 13500 |
| 18 | A | F + B | 99 | 3 | Ti-V based | 3 | 980 | 16 | 15680 |

| Steel pipe No. | Difference in hardness between base material portion and welded portion ΔHV \|HVmax − HVm\| | Difference in hardness between base material portion and welded portion ΔHV \|HVm − HVmin\| | ΔHv: 60 or less | Softening width Ws (mm) | Hydraulic burst test Brittle fracture No: Good Yes: Poor | Weight-drop test Brittle fracture No: Good Yes: Poor | Spinning Cracking | Remarks |
|---|---|---|---|---|---|---|---|---|
| 1 | 20 | 20 | Yes | 0.02 | Good | Good | Good | Example |
| 2 | 25 | 25 | Yes | 0.02 | Good | Good | Good | Example |
| 3 | 25 | 15 | Yes | 0.02 | Good | Good | Good | Example |
| 4 | 20 | 20 | Yes | 0.02 | Good | Good | Good | Example |
| 5 | 15 | 22 | Yes | 0.01 | Good | Good | Good | Example |
| 6 | 20 | 20 | Yes | 0.02 | Good | Good | Good | Example |
| 7 | 25 | 25 | Yes | 0.03 | Good | Good | Good | Example |
| 8 | 15 | 20 | Yes | 0.02 | Good | Good | Good | Example |
| 9 | 20 | 30 | Yes | 0.01 | Good | Good | Good | Example |
| 10 | 70 | 70 | No | 0.06 | Good | Good | Good | Comparative Example |

TABLE 3-continued

| | | | | | | | | |
|---|---|---|---|---|---|---|---|---|
| 11 | 65 | 65 | No | 0.07 | Poor | Poor | Poor | Comparative Example |
| 12 | 66 | 66 | No | 0.07 | Poor | Poor | Poor | Comparative Example |
| 13 | 70 | 65 | No | 0.06 | Poor | Poor | Poor | Comparative Example |
| 14 | 70 | 75 | No | 0.07 | Poor | Poor | Poor | Comparative Example |
| 15 | 65 | 70 | No | 0.06 | Poor | Poor | Poor | Comparative Example |
| 16 | 75 | 66 | No | 0.08 | Poor | Poor | Poor | Comparative Example |
| 17 | 80 | 70 | No | 0.07 | Poor | Poor | Poor | Comparative Example |
| 18 | 45 | 50 | Yes | 0.02 | Good | Good | Good | Example |

*F: ferrite phase, B: bainite phase, M: martensite, P: perlite

In the welded steel pipes in all Examples, a high tensile strength of 780 MPa or more was achieved. Moreover, no brittle fracture was observed in the hydraulic burst test, and no brittle fracture was observed in the weight-drop test at a test temperature of −60° C., so that high pressure resistance and excellent toughness were achieved. In addition, no cracking was observed in the spinning test, so that excellent workability was achieved. In all the Examples, the difference in hardness between the base material portion and the welded portion was small, and the welded steel pipes were excellent in toughness and workability. In the Examples, the welded steel pipes were excellent in pressure resistance, toughness, and workability even after cold drawing.

In Comparative Examples falling outside the preferred scope of the present invention, the strength did not meet the desired high strength, brittle fracture occurred in the weight-drop test, causing deterioration in toughness, or brittle fracture was observed in the fracture surfaces in the hydraulic burst test, causing deterioration in pressure resistance and toughness. In the welded steel pipes in the Comparative Examples, the difference in hardness between the base material portion and the welded portion was large, and the toughness and workability were deteriorated. Therefore, properties sufficient for airbag inflators cannot be ensured.

REFERENCE SIGNS LIST 1 steel pipe raw material
2 open pipe
3 welded steel pipe
11 forming machine
12 contact tip
13 squeeze roll
14 guide roll
15 laser irradiation
31 base material
32 welded portion
33 softened portion

The invention claimed is:

1. A high-strength welded steel pipe for airbag inflators, the welded steel pipe comprising:
   a tubular base material portion; and
   a welded portion formed in the base material portion and extending in an axial direction of the base material portion, wherein,
   the base material portion has a composition containing, in mass %,
   C: 0.02 to 0.08%, Si: 0.001 to 1.0%,
   Mn: 0.1 to 2.0%, P: 0.1% or less,
   S: 0.01% or less, Al: 0.01 to 0.1%,
   N: 0.01% or less, Ti: 0.01 to 0.20%,
   V: 0.01 to 0.50%, and Cr: 0.01 to 0.50%,
   with the balance including Fe and incidental impurities,
   the base material portion has a structure that includes a ferrite phase having an average grain size of 10 μm or less at an area fraction of 90% or more and a Ti, V-based carbide having an average grain size of 10 nm or less and dispersed in the ferrite phase,
   a high tensile strength TS of 780 MPa or more, a strength-elongation balance is TS×El of 15,000 MPa % or more, and the difference ΔHV in Vickers hardness between the base material portion and the welded portion is 60 points or less, and
   a softened portion has a softened width Ws in a circumferential direction of the welded steel pipe being 0.05 mm or less, the softened portion having a Vickers hardness different from the Vickers hardness of the base material portion by at least 30 points.

2. The high-strength welded steel pipe for airbag inflators according to claim 1, wherein
   the base material portion further contains, in mass %, one or more components selected from the following: group A and group B, wherein
   group A: one or more selected from
   Cu: 0.001 to 1.0%, Ni: 0.001 to 1.0%,
   Nb: 0.001 to 0.05%, W: 0.001 to 0.05%, and
   Mo: 0.01 to 1.0%; and
   group B: one or more selected from
   Ca: 0.02% or less and REM: 0.02% or less.

3. A method for manufacturing the high-strength welded steel pipe for airbag inflators according to claim 1, the method comprising the steps of:
   subjecting a steel pipe raw material to cold roll forming to obtain an open pipe;
   abutting end surfaces of the open pipe against each other; and
   joining the end surfaces to each other by laser welding, to form the base material portion and the welded portion.

4. The method for manufacturing the high-strength welded steel pipe for airbag inflators according to claim 3, the method further comprising the steps of:
   after the joining by the laser welding, subjecting the steel pipe to cold drawing.

5. The method for manufacturing the high-strength welded steel pipe for airbag inflators according to claim 4, wherein a reduction in area in the cold drawing is 5 to 50%.

6. The method for manufacturing the high-strength welded steel pipe for airbag inflators according to claim 5, the method further comprising the steps of:

after the cold drawing, subjecting the resulting steel pipe to annealing by heating the steel pipe to a heating temperature of 800° C. or lower.

* * * * *